A. J. KERCHER.
COOKER.
APPLICATION FILED NOV. 29, 1912.
1,154,993.
Patented Sept. 28, 1915.
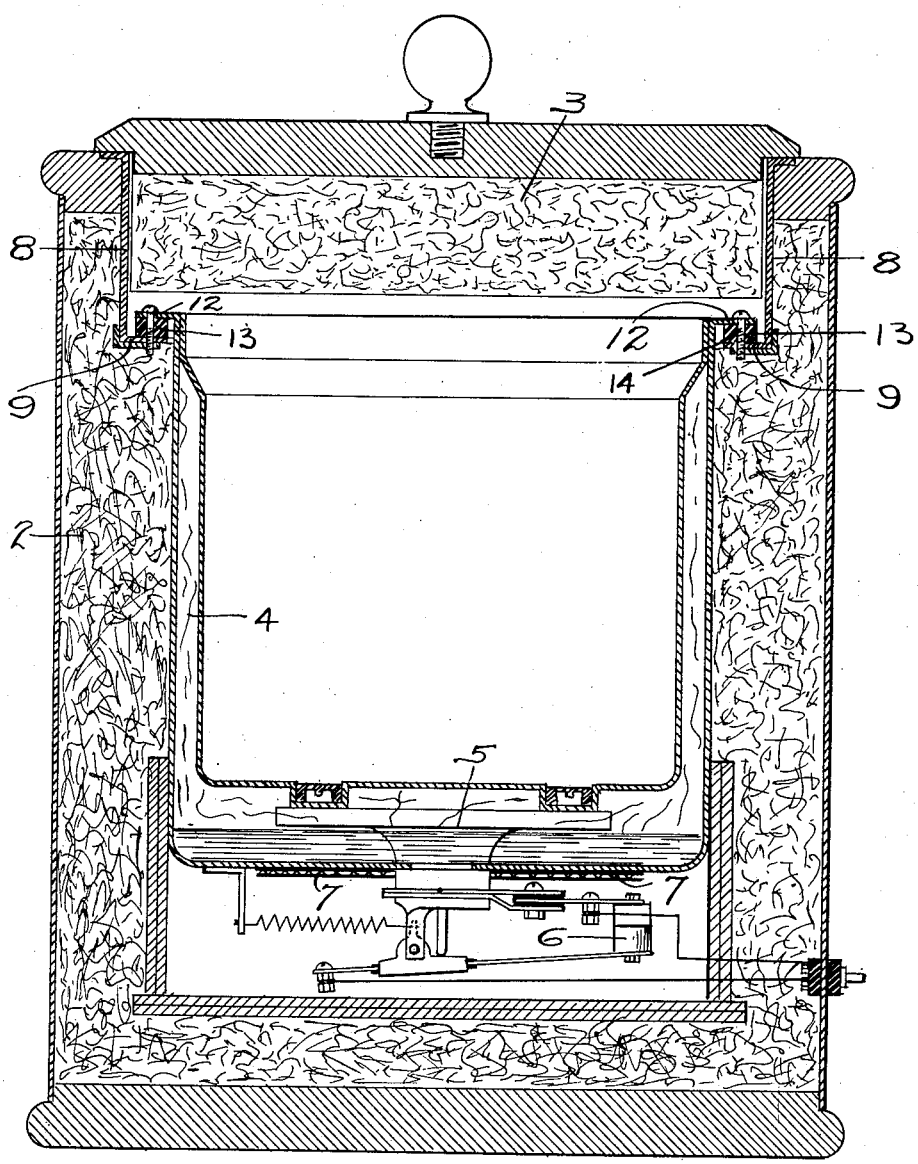
WITNESSES
INVENTOR
Arthur J. Kercher
BY Miller & White
his ATTORNEYS

UNITED STATES PATENT OFFICE.

ARTHUR J. KERCHER, OF BERKELEY, CALIFORNIA, ASSIGNOR TO BERKELEY ELECTRIC COOKER COMPANY, OF BERKELEY, CALIFORNIA, A CORPORATION OF CALIFORNIA.

COOKER.

1,154,993.   Specification of Letters Patent.   Patented Sept. 28, 1915.

Original application filed November 13, 1911, Serial No. 659,894. Divided and this application filed November 29, 1912. Serial No. 733,983.

*To all whom it may concern:*

Be it known that I, ARTHUR J. KERCHER, a citizen of the United States, and a resident of Berkeley, county of Alameda, and State of California, have invented certain new and useful Improvements in Cookers, of which the following is a specification.

The invention relates to cookers generally known as fireless cookers or electrically heated cookers, in which the food is surrounded by a heat insulating material so that substantially all of the heat is employed in cooking the food.

This application is a division of my application Serial Number 659,894, filed in the United States Patent Office on November 13, 1911.

The object of the invention is to provide a cooker having a metallic lining in which no thermal connection is established between the lining and the outside air, so that all of the heat is utilized in cooking.

In the accompanying drawing I have shown the invention applied to an electrically heated cooker, but it is evident that it can be applied to any so-called "fireless cooker."

The drawing is a vertical section of an electrically heated cooker provided with the device of my invention.

The cooker consists of a casing 2 of heat insulating material, preferably cylindrical in shape, and provided with a chamber therein which is closed by the cover 3 which is also provided with heat insulating material.

In the present construction the metallic lining of the chamber consists of a double walled receptacle 4, the space between the walls being sealed and partly filled with water or other liquid. Arranged within the sealed chamber of the receptacle 4, in the casing, is a buckling diaphragm 5 which operates under variations of pressure within the chamber, caused by variations in temperature, to open and close the switch 6 which is in circuit with the electric heating elements 7, arranged on the bottom of the receptacle 4.

The receptacle 4 is suspended within the heat insulated casing, so that the switch mechanism is held above the bottom of the chamber therein by the circular metallic ring 8, which is supported by the heat insulating casing. The ring 8 is provided at its lower end with an inturned flange 9 and the metallic lining or double walled receptacle 4 is provided at its upper edge with an outturned flange 12, overlying the flange 9. The internal diameter of the flange 9 is greater than the external diameter of the metallic lining, and the external diameter of flange 12 is smaller than the internal diameter of the ring 8.

Interposed between the flanges 9 and 12 is a ring 13 of heat insulating material which spaces the flanges apart and breaks the thermal communication between the lining or receptacle 4 and the ring 8. The receptacle 4 or lining is held in place with respect to the ring 8 by means of bolts or screws 14 passing through the flanges and the insulating ring 13.

It is to be understood that the present invention is not to be limited to an electrically heated cooker, nor to a cooker having a double-walled receptacle which forms the lining thereof, but includes all metallically lined cookers. This construction presents a cooker which is substantially heat proof or heat insulated while presenting a completely metallically lined chamber, which may be readily cleaned and washed.

I claim:

A cooker comprising a heat insulating casing having an opening at the top, a metallic ring extending downwardly into said casing, a metallic receptacle of less diameter than said ring arranged within the casing, the upper end of the receptacle lying adjacent and spaced apart from said ring and attached thereto and a ring of heat insulating material arranged between said ring and receptacle, whereby said receptacle is thermally insulated from said ring.

In testimony whereof, I have hereunto set my hand at Berkeley, California, this 20th day of November 1912.

ARTHUR J. KERCHER.

In presence of—
C. S. NAYLOR,
L. G. REIDER.